United States Patent [19]

McOnie et al.

[11] 4,049,895

[45] Sept. 20, 1977

[54] REACTOR AND PROCESS FOR VINYL CHLORIDE POLYMERIZATION

[75] Inventors: Malcolm Peter McOnie, St. Albans, England; Anthony John Philip Tucker, Johannesburg; Peter Willem van Lienden, Kempton Park, both of South Africa

[73] Assignee: Imperial Chemical Industries Limited, London, England

[21] Appl. No.: 710,882

[22] Filed: Aug. 2, 1976

[30] Foreign Application Priority Data

Aug. 26, 1975 United Kingdom ............... 35207/75
July 12, 1976 United Kingdom ............... 28842/76

[51] Int. Cl.$^2$ ........................... C08F 2/18; C08F 14/06
[52] U.S. Cl. ...................................... 526/62; 526/344
[58] Field of Search ............................................ 526/62

[56] References Cited

U.S. PATENT DOCUMENTS

| | | | |
|---|---|---|---|
| 2,975,162 | 3/1961 | Iloff | 526/62 |
| 3,923,765 | 12/1975 | Goetze et al. | 526/62 |
| 3,966,695 | 6/1976 | Flatau et al. | 526/62 |

*Primary Examiner*—Alan Holler
*Attorney, Agent, or Firm*—Cushman, Darby & Cushman

[57] ABSTRACT

A reactor for vinyl chloride polymerization in aqueous dispersion and inside said reactor at least one polished surface provided by a layer constructed from a Cr/Ni stainless steel of Cr content 13-30 wt % and Ni content 20-35 wt %.

Preferably the layer provides at least part of the interior surface of the body of the reactor.

A process for the production of a vinyl chloride polymer in such a reactor is also disclosed.

6 Claims, 8 Drawing Figures

REACTOR AND PROCESS FOR VINYL CHLORIDE POLYMERIZATION

The present invention relates to a reactor for vinyl chloride polymerisation in aqueous dispersion, and to the production of a vinyl chloride polymer in such a reactor.

When vinyl chloride is polymerised in aqueous dispersion in a reactor, it is well known that a problem arises in that surfaces inside the reactor become coated with tenaciously adhering polymeric material known as build-up. By polymerisation in aqueous dispersion is meant polymerisation in aqueous emulsion or in aqueous suspension (including aqueous microsuspension). The formation of tenaciously adhering build-up is undesirable from the point of view of achieving efficient heat transfer for cooling or heating the reactor contents, effective usage of monomer, effective control and monitoring of the polymerisation reaction, and acceptable polymer quality (in view of contamination by dislodged particles of the build-up).

Because of the problems in respect of heat transfer, polymerisation control and polymer quality, it is necessary to clean the reactor between each polymerisation cycle wherein the deposited material is removed as completely as possible, e.g. by scraping by hand, solvent cleaning or pressure-washing. This is wasteful in terms of the expense of the equipment and manpower required to carry out such cleaning and also in terms of the loss in productivity for a given reactor arising from the time taken to effect the cleaning operations.

This seemingly unavoidable formation of build-up, which increases with polymerisation time, is also a major difficulty in the development of a troublefree continuous process for the aqueous dispersion polymerisation of vinyl chloride.

According to the present invention there is provided a reactor for vinyl chloride polymerisation in aqueous dispersion and inside said reactor at least one polished surface provided by a layer constructed from a Cr/Ni stainless steel of Cr content 13–30 wt % and Ni content 20–35 wt %.

It is found that a layer constructed from a Cr/Ni stainless steel of Cr content 13–30 wt % and Ni content 20–35 wt % may be smoothed and polished to provide a surface which possesses no or very low susceptibility to build-up formation when exposed to the medium of a vinyl chloride polymerisation reaction in aqueous dispersion. If any build-up does occur it is very loosely adhering and very readily removable. The problems incurred by the formation of build-up on surfaces inside a reactor employed for vinyl chloride polymerisation in aqueous dispersion are thus eliminated or substantially reduced. By contrast it is found that stainless steels containing greater than 35 wt % of Ni or less than 20 wt % of Ni are not capable of providing layers having polished surfaces which exhibit such reduced susceptibility to build-up formation thereon.

Accordingly there is also provided according to the invention the use of a Cr/Ni stainless steel of Cr content 13–30 wt % and Ni content 20–35 wt % for the construction of a layer providing a polished surface which is inside a reactor as defined herein.

The Cr/Ni stainless steel used in the invention preferably has Ni content of 20–30 wt %, particularly 23–27 wt %. There are a number of commercially available Cr/Ni stainless steels suitable for use according to the invention which have Ni content of about 25 wt %.

One or more layers according to the invention may provide at least part of the interior surface of the actual body of the reactor, as distinct from projections or protuberances such as a thermocouple pocket cover or baffles or other articles such as stirrers. This surface may advantageously be e.g. an interior surface which is particularly susceptible to build-up formation thereon, such as one which is of irregular shape or not exposed to adequate washing by the polymerisation medium or difficult to reach for cleaning purposes. Preferably, one or more layers according to the invention provide substantially the entire interior surface of the body of the reactor and such a reactor permits successive batch polymerisations of vinyl chloride in aqueous dispersion to be carried out without the necessity for interbatch cleaning, thereby improving cost efficiency and the productivity of the reactor. In addition such a reactor may be applied to the continuous polymerisation of vinyl chloride in aqueous dispersion since its use may avoid the previous problem of an ever-thickening build-up deposit.

A reactor according to the invention may be constructed by welding together individual strips or sheets of a Cr/Ni stainless steel as prescribed for use according to the invention, or by casting the whole reactor or part of the reactor in such a steel from a mould. While it is possible in the case of fairly small reactors to provide the entire thickness of the body of the reactor in stainless steel according to the invention, for very large reactors it is preferred in practice that only the interior layer or layers providing the actual surface which will come into contact with the reaction medium are made from such stainless steel, these layers being clad on e.g. a mild steel for reasons of improved material economy and heat-transfer characteristics.

One or more layers according to the invention may also provide at least part of the surface of a projection or protuberance which is inside the reactor, as the surface of such a projection or protuberance may be particularly susceptible to build-up formation thereon, particularly if the surface is irregular in shape (e.g. having sharp corners or indentations). Examples of such projections or protuberances include covers for thermocouple pockets, pressure transducers and baffles. One or more layers according to the invention may also provide at least part of the surface of other types of object employed inside the reactor such as a stirrer, or equipment associated with the stirrer such as a stirrer bearing or a stirrer support.

A reactor which has substantially its entire interior surface constructed from one or more layers according to the invention possesses additional utility in that it may be used for "stripping" at elevated temperatures without the danger of stress corrosion cracking being incurred. The question of "stripping" arises because it is desirable at the end of a vinyl chloride polymerisation reaction in aqueous dispersion (i.e. after the desired conversion of monomer to polymer has been achieved), after having vented off the major part of the residual vinyl chloride by reducing the pressure above the aqueous medium, to remove as much as possible of the last traces of vinyl chloride monomer remaining in the vented dispersion to avoid any possible health hazard which may be associated with the subsequent handling of the dispersion and the product therefrom. This may be achieved by "stripping" the vented dispersion, by reducing the pressure over it and at the same time subjecting it to an elevated temperature, e.g. by passing steam into it through one or more ports in the stripping vessel. The monomer driven off may conveniently be trapped, e.g. using the same equipment as used for retaining the monomer removed by venting. The high temperature stripping operation is thus conveniently carried out in the polymerisation reactor itself.

By contrast reactors made from typical stainless steels containing lower amounts of Ni, e.g. <15 wt %, when repeatedly subjected to conditions experienced in high temperature stripping as described above, carried out e.g. at temperatures of at least 80° C, or even at ordinary vinyl chloride polymerisation temperatures, eventually suffer from stress corrosion cracking. Such reactors are also not capable of providing polished surfaces exhibiting no or much reduced susceptibility to build-up formation.

A reactor according to the invention which has substantially its entire interior surface provided by one or more layers as defined above does not suffer from this disadvantage and may be safely employed for repeated high temperature stripping of vented dispersion. While it is true that layers of stainless steels containing greater than 35 wt % of Ni are also resistant to stress corrosion cracking, they are not capable of providing polished surfaces which exhibit such reduced susceptibility to build-up formation thereon.

The polished finish of a surface inside a reactor according to the invention is preferably one which is achieved by buffing, although the polished finish may be achieved by other means, e.g. by polishing with an extremely fine grade of emery. In the polishing process the surface of the stainless steel layer is first smoothed to an acceptable level of surface fineness, for example by treatment with an abrasive grinding wheel followed by smoothing with emery (e.g. in the form of a wheel) but without obtaining an effective polish, or by rubbing with successively finer grades of abrasive powders again without obtaining an effective polish.

The level of surface fineness mentioned above is expressed in $\mu$ inch (1 $\mu$ inch = 0.0254 $\mu$m) as the Centre Line Average (C.L.A.) value, which is determined by integrating the ordinates of the surface profile with respect to a mean line drawn on the profile graph taking into account an arbitrary "cut off value" above and below which the value of the ordinates are discarded for the purpose of integration (see British Standard 1134). An acceptable level of surface fineness is preferably one corresponding to not more than 15 $\mu$ inch (0.40 $\mu$m) C.L.A. although the initial treatment allows the preparation of surfaces with surface fineness as low as 2 $\mu$ inch (0.050 $\mu$m) C.L.A. or less, and from the point of view of resistance to build-up it is advantageous that the surface be as smooth as possible at this stage (before polishing e.g. by buffing). However, in the case of preparing a surface which is to constitute the interior of a large reactor, it would be uneconomic to attempt to achieve a surface fineness as low as 2 $\mu$ inch C.L.A. since this would take too long and/or too much effort and a surface fineness with a lower limit of 8 $\mu$ inch (0.20 $\mu$m) is more practicable.

In the buffing treatment the steel surface is polished with a soft fabric or leather, the material being e.g. in the form of or attached to a revolvable wheel. Suitable buffs are made from materials such as calico, cotton, chamois skin and sheepskin. It is possible to carry out the buffing without the addition of a lubricant (dry or clean buffing) but it is preferred to impregnate the buff with a lubricant such as soap or a commercial metal polish (wet buffing).

The polishing treatment afforded e.g. by buffing is not found to affect the actual value of C.L.A. to any significant extent of a surface which is already very smooth (in terms of C.L.A. value) to begin with (for example, we have found that the lowering of C.L.A. value for a surface of 10–12 $\mu$ inch C.L.A. is generally not greater than 1–2 $\mu$ inch C.L.A. as a result of the final polishing treatment). What the polishing does, we believe, is to cause localised flow of the surface (so that it becomes smeared to some extent), i.e. to make the surface less jagged and more gently undulating. It is surprising that only the steels as defined according to the invention respond at all significantly to the polishing treatment and become so much less susceptible to build-up formation or adherence whereas steels of Ni content greater than 35% by wt or less than 20% by wt do not.

This effect may be demonstrated by reference to FIGS. 1 to 8 of the accompanying drawings which are magnified surface profiles, traced with a fine stylus, of samples of polished metal sheets (vertical magnification × 5000, horizontal magnification × 20).

Figure 1:
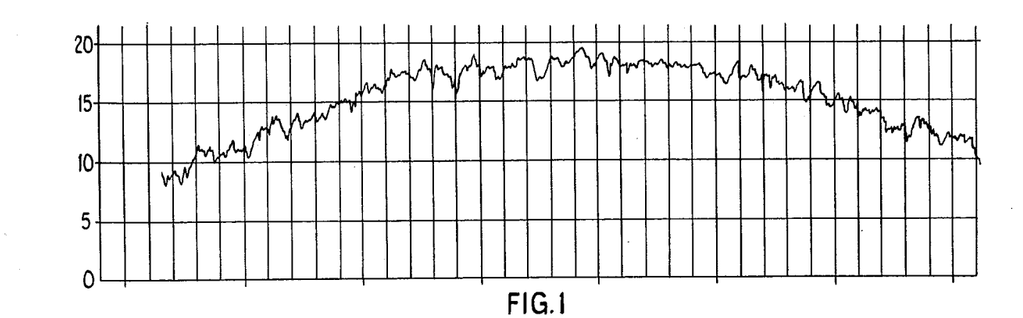
Figure 2:
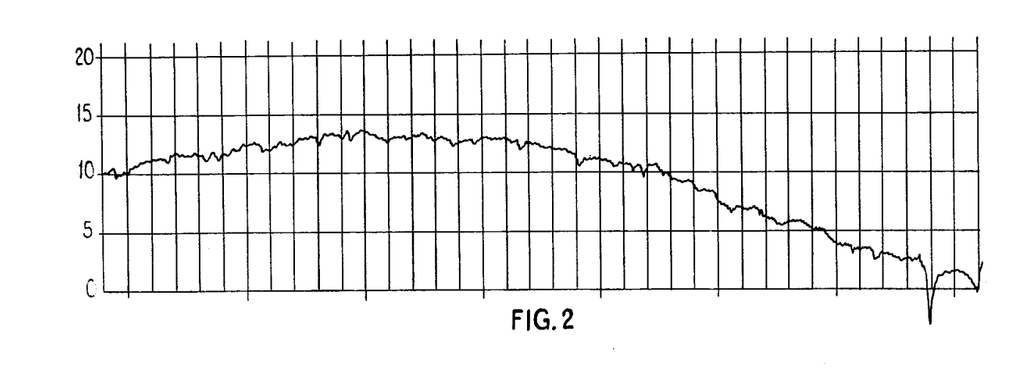
Figure 3:
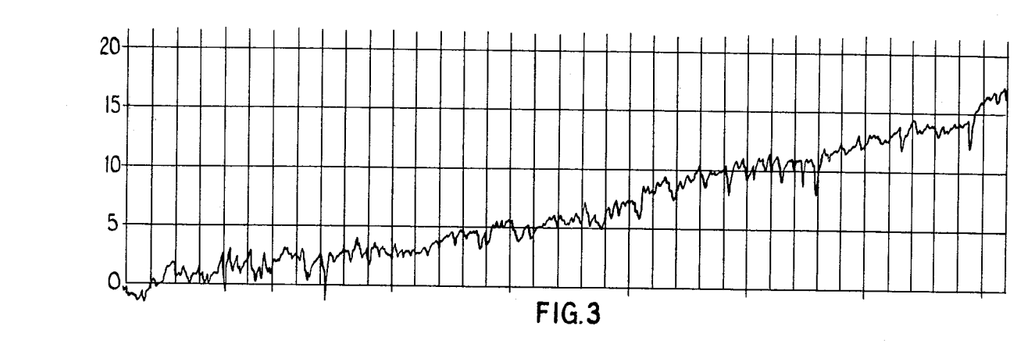
Figure 4:
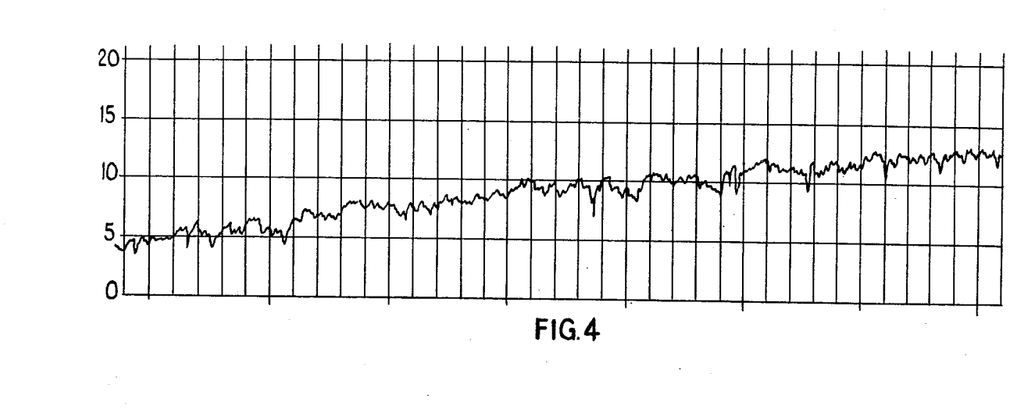

FIGS. 1 and 2 are the surface profiles of samples of a stainless steel (commercially availble as Sandvik 2RK65) having the average analysis (by weight): Cr — 20%, Ni — 25%, Mo — 4.5%, Cu — about 1.5%, C — less than 0.02%. FIGS. 3 and 4 are the surface profiles of samples of a stainless steel having the average analysis (by weight): Cr — 18%, Ni — 8%, Ti — five times the C content, C — less than 0.08%. The samples giving the traces of FIGS. 1 and 3 were prepared by grinding followed by emery treatment (without obtaining an effective polish) to an approximate surface fineness of 8–10 $\mu$ inch (0.20–0.25 $\mu$m) C.L.A. The samples of FIGS. 2 and 4 are those of FIGS. 1 and 3 respectively when further treated by buffing in order to polish them (the sample of FIG. 1 being wet buffed and that of FIG. 3 being dry buffed). It can be seen that polishing by buffing had a pronounced improving effect on the smoothing of the surface profile of the steel of Ni content 25 wt % (compare FIGS. 1 and 2) but very little effect on the steel of Ni content 8 wt % (compare FIGS. 3 and 4).

The traces of FIGS. 1 to 4 were all taken parallel to the grinding direction; the same effect was found for these samples when the traces were taken perpendicular to the grinding direction.

Figure 5:
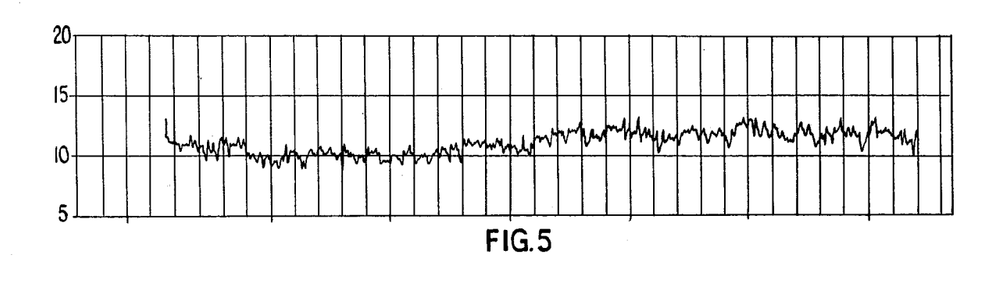
Figure 6:
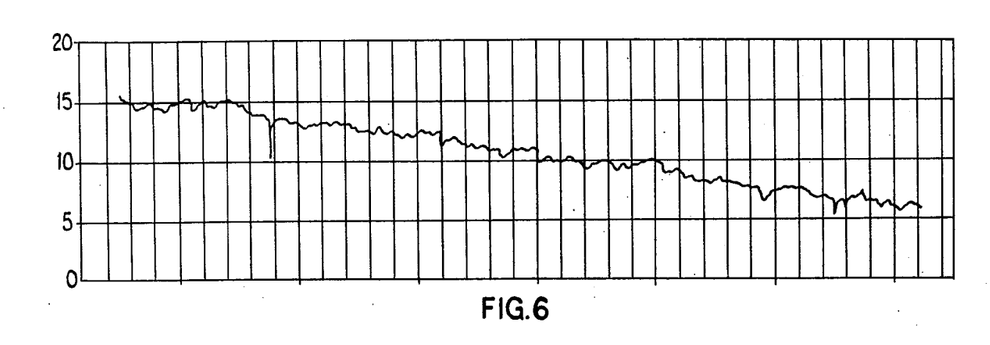
Figure 7:
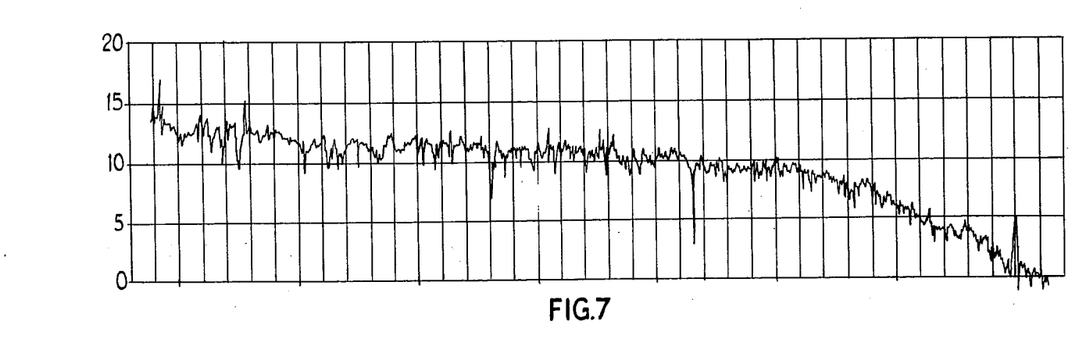
Figure 8:
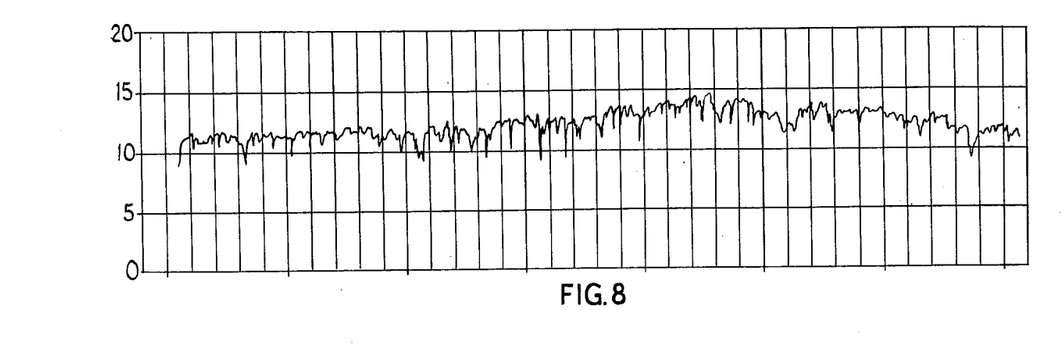

A similar effect is shown in FIGS. 5–8. FIGS. 5 and 6 are the surface profiles of a stainless steel (commercially available as Avesta 254SLX) having the average analysis (by weight): Cr — 20%, Ni — 25%, Mo — 4.5%, Mn — 1.5%, Si — 0.5%, Cu — 1.5%, C — 0.02%. FIGS. 7 and 8 are the surface profiles of the same stainless steel providing the profiles shown in FIGS. 3 and 4. The samples giving the traces of FIGS. 5 and 7 were prepared by grinding followed by emery treatment (without obtaining an effective polish) to an approximate surface fineness of 8–10 $\mu$ inch (0.20–0.25 $\mu$m) C.L.A. The samples of FIGS. 6 and 8 are those of FIGS. 5 and 7 respectively after both had been further treated by wet buffing in order to polish them. It can be seen that polishing by buffing under exactly the same conditions had a pronounced improving effect on the smoothness of the surface profile of the steel of Ni content 25 wt % (compare FIGS. 5 and 6) but very little effect on the steel of Ni content 8 wt % (compare FIGS. 7 and 8).

The traces of FIGS. 5-8 were all taken perpendicular to the grinding direction.

The steel used in the present invention contains at least 13% Cr to provide acceptable resistance to the acid medium of the vinyl chloride polymerisation reaction; the use of more than 30% Cr would render the material too expensive and such steels are not commercially available as far as we know.

The stainless steel according to the invention may contain minor amounts (e.g. up to about 6 wt %) of other elements (i.e. in addition to Cr, Ni, Fe and carbon) some of which may further improve the properties of the steel. Such elements include Mo, Mn, Cu, S, P, and Si. The use of up to 5 wt % Mo is particularly recommended as this further improves resistance to acid corrosion. The percentage of carbon may also be varied to optimise the material properties.

Examples of suitable commercially available steels for use according to the present invention are given in the following Table 1 (analytical date of average analyses taken from manufacturers' brochures).

TABLE 1

| Trade Name | Composition (weight %) | | | Manufacturing Company |
|---|---|---|---|---|
| | Cr | Ni | Other | |
| Sandvik 2RK65 | 20 | 25 | Mo 4.5, Cu ~ 1.5, C <0.02 | Sandvik |
| UHB 904L | 20 | 25 | Mo 4.5, Mn 1.7, Si 0.35, Cu 1.5, C <0.02 | Uddeholm |
| Avesta 254SLX | 20 | 25 | Mo 4.5, Mn 1.5, Si 0.5, Cu 1.5, C 0.02 | Avesta |
| Uranus B6 | 20 | 25 | Mo 4.3, Cu 1.5, C <0.02 | Creusot Loire |

Sandvik : Sandvik AB, Sandviken, Sweden
Uddeholm : Uddeholms Aktiebolog, Steel Division, Sweden
Avesta : Avesta Jernverks AB, Avesta, Sweden
Creusot-Loire, Direction generale Branch metallurgie, 12 rue de la Rochefoucauld, Paris On the other hand the use of the commercially available steel Incoloy 825 (composition by weight Cr — 22%, Ni — 38%, Mo — 3%, Cu — 2%, C less than 0.05%) (made by Henry Wiggin & Co Limited) is outside the scope of the present invention. Although this steel has acceptable stress corrosion resistance, it is more susceptible to the formation of tenaciously adhering build-up even with a highly polished surface. Particularly preferred for use according to the invention are the steels Sandvik 2RK65, Uranus B6, Avesta 254SLX, and UHB 904L.

By the term "vinyl chloride polymerisation" is meant the homopolymerisation of vinyl chloride and also the copolymerisation of vinyl chloride to provide copolymers containing at least 50% molar, and preferably at least 80% molar, of vinyl chloride units. Suitable comonomers include vinyl esters such as vinyl acetate, acrylic and methacrylic esters such as methyl acrylate, methyl methacrylate and butyl acrylate, α-olefines such as ethylene and propylene, vinyl ethers, and styrene and substituted styrene compounds.

Accordingly there is also provided according to the invention a process for the production of a vinyl chloride polymer wherein vinyl chloride is homopolymerised or copolymerised in aqueous dispersion in a reactor as defined herein.

The present invention is applicable to vinyl chloride polymerisation in aqueous emulsion and microsuspension which both yield products in the form of latices, and also to vinyl chloride polymerisation in aqueous suspension (sometimes called granular polymerisation) wherein the product is obtained in the form of a slurry. Also, as mentioned above, where the polished surface or surfaces according to the invention constitute substantially the entire interior surface of the body of the reactor, the vented dispersion is advantageously stripped while it is still in the reactor, preferably at an elevated temperature e.g. above 80° C.

In terms of commercial significance, the invention is most useful in respect of vinyl chloride homopolymerisation which is employed more widely than copolymerisation.

The following Examples 1 to 25 describe experiments for the purpose of investigating the susceptibility of the surfaces of various stainless steels to build-up formation or the ease of removal of any build-up which does form on such surfaces. The experiments were conducted by mounting rectangular test samples (i.e. layers) of the steels (about 7-8 inches (175-200 mm) long, 1.5-2.5 inches (40-55 mm) wide and ⅛-⅜ inch (3-10 mm) thick) on a curved strip which strip follows the curvature of the reactor, and immersing the samples in the reaction medium for the whole of a typical vinyl chloride polymerisation. The mounting strip was capable of carrying up to six test samples, each sample being screwed at one end to the strip and extending above or below the strip so as to be close to the reactor wall when inside the polymerisation reactor (the curved mounting strip being provided with a handle for lowering it into and mounting it within the polymerisation reactor). The surface of each test sample to be exposed was prepared by first grinding the surface with a grinding wheel followed by sequential rubbing with grades of dry emery (mounted on a rotating sander) of increasing fineness according to the degree of surface fineness (with reference to the Center Line Average property) required of the sample, but without achieving an effective polish. The sample so prepared was either used as such in the experiment or, in some cases, polished by wet or dry buffing as described hereinbefore.

In Examples 1 to 6, 7 to 12, 13 to 15 and 22 to 25 corresponding to Runs 1, 2, 3 and 5 respectively, the polymerisation reaction was a typical one used for the production of a granular vinyl chloride homopolymer in stirred aqueous suspension employing diethyl peroxydicarbonate as initiator and partially hydrolysed polyvinyl acetate as suspension agent.

In Examples 16 to 21, corresponding to Run 4, the polymerisation was a typical one for the production of a paste-grade vinyl chloride homopolymer using a stirred homogenised dispersion polymerisation process with a lauroyl peroxide/dicetyl peroxydicarbonate initiator system and sodium dodecyl benzene sulphonate as dispersion agent.

EXAMPLES 1 to 6

In these examples (Run 1), six samples (corresponding to Examples 1 to 6) were screwed to the curved mounting strip and immersed in the reaction medium during the polymerisation as described above. The compositions of the steels used, their surface preparation, and the resulting build-up thereon, are set out in Table 2.

It is seen from Table 2 that buffing the surface of the sample of Example 6 (a steel for use according to the invention) resulted in a pronounced decrease in its susceptibility to build-up formation, even though its C.L.A. valve was larger than that of the unbuffed samples of Examples 4 and 5 (of the same metal). In Examples 1 to 3 (corresponding to the use of steels which would be outside the invention) the unbuffer samples all had build-up irrespective of their C.L.A. value.

Example 6) was again completely clean. While the samples corresponding to Examples 10 and 11 (the use of which would be according to the invention) did have build-up on them, it was easier to remove on an overall assessment in terms of break-through pressure and track width than the build-up on the samples corresponding to Examples 7 to 9 (the use of which would not be according to the invention).

EXAMPLES 13 to 15

The composition, surface preparations, and build-up data, in respect of three samples corresponding to Ex-

TABLE 2

| Example No. | Composition of steel (weight %) | Approximate Surface Fineness after emery treatment (CLA) | Buffing | Build-up formation |
| --- | --- | --- | --- | --- |
| 1 | Cr 18, Ni 8, Ti (5 × C content) C <0.08 | 2 μ inch (0.050 μm) | Not buffed | Thin hard skin |
| 2 | Cr 18, Ni 8, Ti (5 × C content), C <0.08 | 14–16 μ inch (0.350–0.400 μm) | Not buffed | Thin hard skin |
| 3 | Cr 17, Ni 13, Mo 2.7, C <0.03 | 4 μ inch (0.100 μm) | Not buffed | Thin hard skin |
| 4 | Cr 20, Ni 25, Mo 4.5, Cu~1.5, C <0.02 (Sandvik 2RK65) | 3 μ inch (0.075 μm) | Not buffed | Thin hard skin |
| 5 | Cr 20, Ni 25, Mo 4.5, Cu~1.5, C <0.02 (Sandvik 2RK65) | 8–10 μ inch (0.200–0.250 μm) | Not buffed | Thin hard skin |
| 6 | Cr 20, Ni 25, Mo 4.5, Cu~1.5, C <0.02 (Sandvik 2RK65) | 9–12 μ inch (0.225–0.300 μm) | Wet buffed | None (clean surface) |

EXAMPLES 7 to 12

The compositions, surface preparation, and build-up formation, in respect of the six samples used in Examples 7 to 12 (Run 2) are set out in Table 3. Also shown in Table 3 is the ease of removal of build-up formed in terms of break-through pressure and maximum track-width all measured under standardised conditions. By break-through pressure is meant the pressure required of a high-pressure water jet (delivered from a tungsten carbide wire die nozzle, diameter 0.14 mm, positioned 43 mm above the metal sample) to initially pierce the build-up layer. By maximum track-width is meant the approximate maximum width of the clean track provided by the cleaning jet.

In this Run, all the samples had been buffed.

It is to be noted that the sample corresponding to Example 12 (the same metal/surface preparation as in amples 13–15 (Run 3) are set out in Table 4. It is to be noted that in Examples 13 and 14 only the bottom half of the sample surface was further treated by buffing.

It is seen that the sample corresponding to Example 15 had a completely clean surface and was superior to the other samples (corresponding to metals the use of which would be outside the scope of the invention).

EXAMPLE 16 to 21

The compositions, surface preparation, and build-up data, in respect of the six samples used in Examples 16 to 21 (Run 4) are set out in Table 5.

TABLE 3

| Example No. | Composition of steel (weight %) | Approximate Surface Fineness after emery treatment (CLA) | Build-up Buffing | Build-up information | Ease of Removal of Break-through pressure (psi) | Maximum track width (mm) |
| --- | --- | --- | --- | --- | --- | --- |
| 7 | Cr 18, Ni 8, Ti (5×C content), C <0.08 | 2 μ inch (0.050 μm) | Dry buffed | Thin hard skin | 1000 (6.9 MPa) | 8 |
| 8 | Cr 18, Ni 8, Ti (5×C content), C <0.08 | 14–16 μ inch (0.350–0.400μm) | Dry buffed | Thin hard skin | 1250 (8.6 MPa) | 8 |
| 9 | Cr 22, Ni 38, Mo 3, Cu 2, C 0.05 (Incoloy 825) | 6 μ inch (0.150 μm) | Dry buffed | Thin hard skin | 800–900 (5.5–6.2 MPa) | 2 |
| 10 | Cr 20, Ni 25, Mo 4.5, Cu~1.5, C <0.02 (Sandvik 2RK65) | 3 μ inch (0.075 μm) | Wet buffed | Thin hard skin | 750–850 (5.2–5.9 MPa) | Large scale peeling and blistering with rapid removal |
| 11 | Cr 20, Ni 25, Mo 4.5, Cu~1.5, C < 0.02 (Sandvik 2RK65) | 8–10 μ inch (0.200–0.250μm) | Wet buffed | Thin hard skin | 800 (5.5 MPa) | 8 |
| 12 | Cr 20, Ni 25, Mo 4.5, Cu~1.5, C <0.02 (Sandvik 2RK65) | 9–12 μ inch (0.225–0.300μm) | Wet buffed | None (clean surface) | — | — | the invention) show improved susceptibility to build-up removal in comparison to the buffed steel of Examples 16 to 17 of lower Ni content and the unbuffed steel of Example 21 of the same Ni content.

EXAMPLES 22 to 25

The compositions, surface preparation, and build-up data, in respect of the four samples used in Examples 22-25 (Run 5) are set out in Table 6.

It is seen that the buffed steels corresponding to Examples 22 and 23 (the use of which would be according to the invention) show lower susceptibility to build-up formation in comparison to the buffed steels of Examples 24 and 25 of lower Ni content. It is also apparent from Examples 22 and 24 that wet buffing may be slightly more effective than dry buffing.

TABLE 4

| Example No. | Composition of steel (weight %) | Approximate Surface Fineness after emery treatment (CLA) | Buffing | Build-up formation |
|---|---|---|---|---|
| 13 | Cr 18, Ni 8, Ti (5 × C content), C <0.08 | 8–10 μ inch (0.200–0.250μm) | Top half not buffed | thin skin |
|  |  |  | Bottom half dry buffed | thin skin |
| 14 | Cr 17, Ni 13 Mo 2.7 C <0.03 | 8–10 μ inch (0.200–0.250μm) | Top half not buffed | thin skin |
|  |  |  | Bottom half half dry buffed | thin skin |
| 15 | Cr 20, Ni 25, Mo 4.5, Cu ~1.5, C <0.02 (Sandvik 2RK65) | 8–10 μ inch (0.200–0.250μm) | Both halves wet buffed | None (clean surface) |

TABLE 6

| Example No. | Composition of steel (weight %) | Approximate Surface Fineness after emery treatment (CLA) | Buffing | build-up formation |
|---|---|---|---|---|
| 22 | Cr 20, Ni 25, Mo 4.5, Cu ~ 1.5, C <0.02 (Sandvik 2RK65) | 3 μ inch (0.075 μm) | Wet buffed | None clean surface |
| 23 | Cr 20, Ni 25, Mo 4.5, Mn 1.5, Si 0.5, Cu 1.5, C 0.002 (Avesta 254SLX) | 10 μ inch (0.250 μm) | Top half wet buffed / Bottom half dry buffed | None (clean surface) / Some skin patches-otherwise clean |
| 24 | Cr 17, Ni 13, Mo 2.7, C <0.03 | 4 μ inch (0.100 μm) | Top half wet buffed / Bottom half dry buffed | Skin |
| 25 | Cr 18, Ni 8, Ti (5 × C content), C <0.08 | 2 μ inch (0.50 μm) | Top half wet buffed / Bottom half dry buffed | Skin |

EXAMPLE 26

A cylindrical reactor employed commercially for the production of a grade of vinyl chloride homopolymer was adapted to demonstrate the utility of the invention. The body of the reactor was made from a stainless

TABLE 5

| Example No. | Composition of steel (weight %) | Approximate Surface Fineness after emery treatment (CLA) | Buffing | Build-up formation | Approximate % area covered by build-up | Ease of Removal Break-through pressure (psi) | Maximum track width (mm) |
|---|---|---|---|---|---|---|---|
| 16 | Cr 18, Ni 8, Ti (5 × C content), C <0.08 | 2 μ inch (0.050 μm) | Dry buffed | Thin skin* | 100 | 1000–1100 (6.9–7.6 MPa) | 1.5 |
| 17 | Cr 17, Ni 13, Mo 2.7 C <0.03 | 4 μ inch (0.100 μm) | Top half wet buffed / Bottom half dry buffed | Thin skin* | 100 | 400 (2.8 MPa) / 300 (2.1 MPa) | a little peeling |
| 18 | Cr 20, Ni 25, Mo 4.5, Cu~1.5, C <0.02 (Sandvik 2RK65) | 3 μ inch (0.075 μm) | Wet buffed | Thin skin* | 40 | 350–400 (2.4–2.8 MPa) | much peeling |
| 19 | Cr 20 Ni 25, Mo 4.5 Cu~1.5, C <0.02 (Sandvik 2RK65) | 8–10 μ inch (0.200–0.250μm) | Wet buffed | Thin skin* | 80 | 350–400 (2.4–2.8 MPa) | much peeling |
| 20 | Cr 20, Ni 25, Mo 4.5 Cu~1.5, C <0.02 (Sandvik 2RK65) | 9–12 μ inch (0.225–0.300μm) | Wet buffed | Thin skin* | 80 | 200–300 (1.4–2.1 MPa) | much peeling |
| 21 | Cr 20, Ni 25, Mo 4.5 Cu~1.5, C <0.02 (Sandvik 2RK65) | 15–18 μ inch (0.375–0.450μm) | Not buffed | Thin skin* | 100 | 550–600 (3.8–4.1 MPa) | 1.5 |

*under powdery lumps easily washed off under the tap.

It is seen that the buffed steels corresponding to Examples 18 to 20 (the use of which would be according to the invention) show improved susceptibility to build-up removal in comparison to the buffed steel not according to the invention. Below the stirrer of the reactor, i.e. at the bottom of the reactor, was located a dome-shaped thermocouple pocket cover constructed from Avesta 254SLX stainless steel. The surface of the cover had been given an effective polish by grinding on a lathe, followed by further rubbing on the lathe with increasingly fine grades of emery, and finishing off with an extremely fine grade of emery to provide a mirror-like polish. The value for surface finish was approximately 8–10 $\mu$ inch (0.20–0.25 $\mu$m) C.L.A.

The reactor was then employed in 254 successive batch polymerisations for the production of a typical grade of vinyl chloride homopolymer (K value 60) in stirred aqueous suspension using a polymerisation temperature of 56° C. Between each polymerisation the reactor was cleaned by means of high-pressure water jets, although it was found that the water jets were not impinging to any extent on the area below the stirrer where the thermocouple pocket cover was located. At the end of these successive batch polymerisations, the thermocouple pocket cover was found to be still shiny and completely clean while the area around the cover was heavily encrusted with build-up. This result was all the more significant in that the cover had a sharp macro indentation in it, which would normally provide a site for severe build-up formation. The utility of maintaining a thermocouple pocket cover free of build-up for the purpose of accurately monitoring polymerisation temperature is self-evident.

EXAMPLE 27

The bottom-located thermocouple pocket cover used in Example 26 was replaced with one identical in shape but made from Incoloy 825 stainless steel. The surface of the cover had been polished in the same manner as the cover of Example 26, the surface finish being 5–8 $\mu$ inch (0.13–0.20 $\mu$m) C.L.A.

The reactor was then employed in 218 successive batch reactions as in Example 26, exactly the same recipe being employed. At the end of these polymerisations, the thermocouple pocket made from Incoloy 825 was found to have build-up adhering thereto.

EXAMPLE 28

A reactor of capacity 160 litres was built having substantially its entire body made from UHB 904L stainless steel. The reactor was cylindrical in shape with a dished bottom part and a dished lid and was assembled by welding together appropriately shaped sheets of the UHB 904L steel, the welds being ground flush with the reactor surface. The interior surface of the reactor was prepared by first rubbing with progressively finer grades of commercially available abrasive powders and then finally polishing by wet buffing to achieve a mirror-like finish. The values of surface fineness taken at five different locations on the interior surface were all within the range 8–12 $\mu$ inch (0.20–0.30 $\mu$m) C.L.A.

A series of typical batch vinyl chloride homopolymerisations in stirred aqueous suspension were carried out in the reactor, the polymerisation temperature being 57° C, the suspension agent being partially hydrolysed polyvinyl acetate and the initiator being diethyl peroxydicarbonate. Four such polymerisations were carried out successively without interbatch cleaning whereon close inspection of the interior surface of the reactor revealed that it was still shiny and completely clean.

We claim:

1. A process for the production of a vinyl chloride polymer wherein vinyl chloride is homopolymerised or copolymerised in aqueous dispersion in a reactor having inside at least one polished surface provided by a layer constructed from a Cr/Ni stainless steel of Cr content 13–30 wt % and Ni content 20–35 wt %.

2. A process according to claim 1 wherein the homopolymerisation or copolymerisation is carried out in aqueous emulsion.

3. A process according to claim 1 wherein the homopolymerisation or copolymerisation is carried out in aqueous suspension or microsuspension.

4. A process according to claim 1 wherein the homopolymerisation or copolymerisation is carried out in a reactor in which the at least one polished surface constitutes substantially the entire interior surface of the body of the reactor.

5. A process according to claim 4 wherein after the desired conversion of monomer to polymer, the reactor is vented and the vented dispersion is stripped while still in the reactor.

6. A process according to claim 4 wherein the stripping is carried out at a temperature of at least 80° C.

* * * * *